May 29, 1962 E. J. DILLMAN 3,036,778
PRESSURE REGULATOR FOR DIAPHRAGM GAS VALVES
Filed Aug. 6, 1956 2 Sheets-Sheet 1
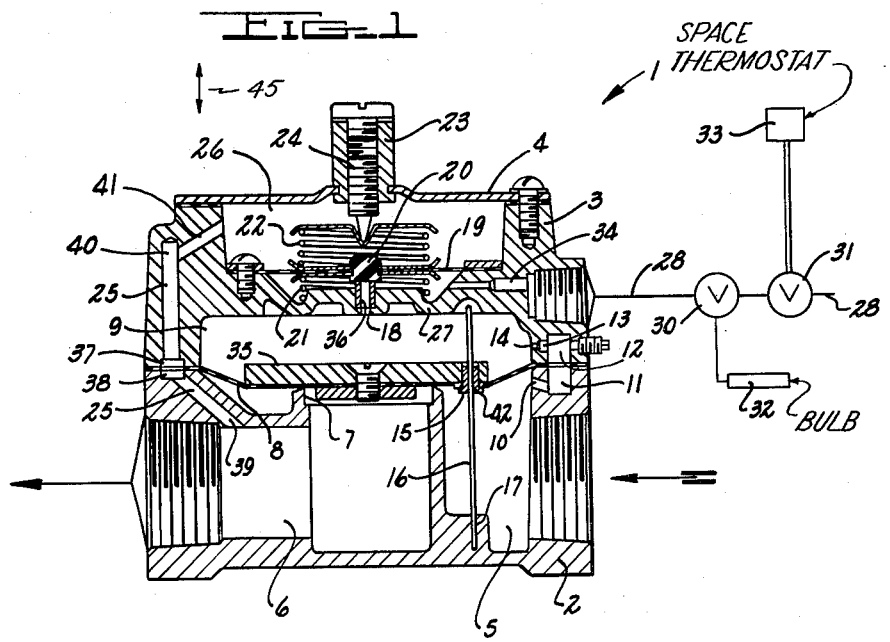
INVENTOR
EARNEST J. DILLMAN
BY
SMITH, OLSEN, LEWIS & McRAE
ATTORNEYS

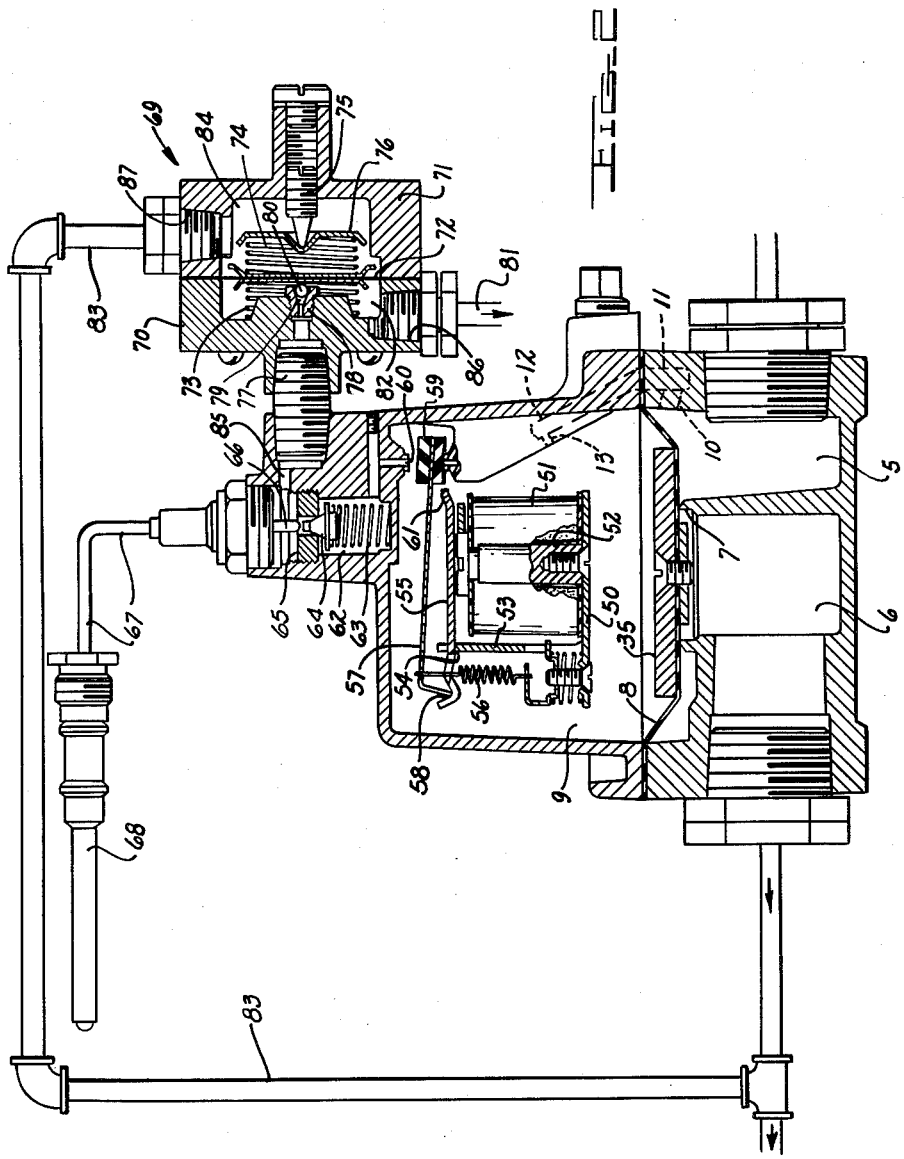

United States Patent Office 3,036,778
Patented May 29, 1962

3,036,778
PRESSURE REGULATOR FOR DIAPHRAGM
GAS VALVES
Earnest J. Dillman, Detroit, Mich., assignor, by mesne assignments, to American Radiator & Standard Sanitary Corporation, New York, N.Y., a corporation of Delaware
Filed Aug. 6, 1956, Ser. No. 602,346
2 Claims. (Cl. 236—80)

This invention relates to fluid regulator mechanisms, and particularly to mechanisms for regulating the gas pressure at the main burner of a gas burner.

Objects of the invention are to provide a fluid regulator mechanism wherein:

(1) The output fluid pressure is quite closely regulated, (2) The regulator is of such construction as to be easily and economically put under the control of any number of different control devices; as for example a control responsive to a gas burner pilot flame, or a room thermostat type control, (3) The regulator is effective both as a pressure regulator and as a device for starting and stopping fluid flow, (4) The regulator mechanism is of comparatively low cost construction, and certain of its mechanisms are susceptible of formation by economical die casting operations, and (5) The regulator mechanism utilizes only a small portion of the gas passing through the apparatus, thereby making it possible to construct the regulator mechanism as a separate, relatively small attachment for a gas valve, irrespective of the capacity or dimension of the gas valve.

Other objects of this invention will appear in the following description and appended claims, reference being had to the accompanying drawings forming a part of this specification wherein like reference characters designate corresponding parts in the several views.

In the drawings:

FIG. 1 is a view partly in section and partly schematic showing one embodiment of the invention.

FIG. 2 is a sectional view of another embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In FIG. 1 there is shown a fluid regulator mechanism 1 including housing members 2, 3 and 4.

Member 2 is hollowed out to form an inlet chamber 5, an outlet chamber 6 and a port 7 therebetween. A port-closing wall in the form of a flexible diaphragm 8 extends across port 7 and the open upper end of member 2.

Member 3 is contoured to provide a chamber 9. Conduits 10, 11, 12, 13 and 14 are drilled into members 2 and 3 to permit fluid flow between chambers 5 and 9. In lieu of conduits 10 through 14 fluid flow between chambers 5 and 9 may be accomplished by positioning a sleeve 15 in diaphragm 8. Sleeve 15 wipingly encircles a wire element 16 anchored at 17 in member 2, the purpose of element 16 being to prevent dirt from becoming clogged in sleeve 15 during operation of the regulator mechanism. A slight clearance space 42 exists between sleeve 15 and wire element 16 such as to permit fluid flow between chambers 5 and 9. It will be understood that in practice only one of passage systems 10 through 14 and 15 through 17 need be employed in any one device.

One wall 27 of chamber 9 is apertured to provide a port 18, and a port-closing element in the form of a flexible diaphragm 19 is positioned outside of chamber 9 to open and close port 18. A plug 20 of rubber or other deformable material is secured centrally in diaphragm 19 to sealingly engage against a cylindrical seat-forming member 36 when diaphragm 19 is in its illustrated position.

Compression springs 21 and 22 are positioned above and below diaphragm 19 to hold said diaphragm in desired position above port 18. Housing member 4 has secured thereto an internally threaded sleeve 23, and an adjusting screw 24 threadedly extends through sleeve 23. Adjustment of screw 24 will vary the strength or pressure of spring 22, and will thereby determine the pressure in chamber 6, as will be apparent at a later point in the description. In this connection it will be noted that a number of connecting passages 37 through 41 are drilled in members 2 and 3. These passages define a conduit 25 between chambers 6 and 26. Conduit 25 insures that the pressure in chamber 26 will be the same as that in chamber 6.

Member 3 is drilled through as at 34 to provide a bleed passage leading from the space between diaphragm 19 and wall 27. The space between diaphragm 19 and wall 27 may itself be considered as part of the bleed passage. A bleed conduit, shown schematically at 28, leads from passage 34 to any suitable low pressure area, as for example the main burner of the gas burner. The internal cross sectional area of conduit 28 is preferably greater than that of passages 13 or 42. Conduit 28 is provided with conventional needle valves at 30 and 31.

Valve 30 is controlled by a conventional thermal bulb 32 positioned adjacent the pilot flame of a conventional gas burner (not shown). When the pilot flame is on, needle valve 30 is fully open, and when the pilot flame is extinguished needle valve 30 is fully closed.

Valve 31 is preferably solenoid-operated and controlled by a thermostat 33 positioned in the space or room being heated by the gas burner. When the thermostat is calling for heat valve 31 is fully open, and when the thermostat is satisfied valve 31 is fully closed.

Operation of the regulator system is such that when either of valves 30 or 31 is closed the pressure in chamber 9 is equal to that in chamber 5. As a result diaphragm 8 closes port 7 and prevents any fluid flow through the regulator mechanism.

When both valves 30 and 31 are fully opened more fluid is exhausted from chamber 9 through port 18 than is admitted to chamber 9 through passages 13 or 42 (due to the fact that bleed passage 34, 28 is of greater cross sectional area than passages 13 or 42). As a result the pressure in chamber 9 is less than that in chamber 5, and the inlet pressure is effective to raise diaphragm 8 and its weight 35 away from port 7 so as to allow fluid to flow into outlet chamber 6.

The fluid pressure in chamber 6 is directed through conduit 25 to the upper face of diaphragm 19. If the pressure in chamber 6 should increase beyond a predetermined value (as determined by the adjustment of screw 24) diaphragm 19 will tend to be forced downwardly to a position closing port 18. Closing of port 18 will cause the pressure in chamber 9 to build up until it forces diaphragm 8 downwardly toward a closed position against port 7. This action will in turn reduce the pressure in chamber 6. Reduction of the pressure in chamber 6 is effective to raise diaphragm 19 away from port 18. This raising and lowering of diaphragms 19 and 8 will in some cases be continuous, but the net effect will be to produce a substantially constant equilibrium pressure in chamber 6.

The "adjusting" function of screw 24 may be best understood by ascertaining the pressures which exist on the opposite faces of diaphragm 19.

The pressures on the lower face of diaphragm 19 consist largely of the pressures developed by spring 21. The fluid pressure against the lower face of diaphragm 19 is relatively insignificant because the fluid is being exhausted through line 28.

The pressures on the upper face of diaphragm 19 are those pressures developed by spring 22 plus the fluid pressure in chambers 26 and 6.

Thus, the pressure of spring 21 equals the total of the pressures developed by spring 22 and the fluid in chamber 26. By turning screw 24 downwardly in sleeve 23 the strength or pressure of spring 22 is increased without appreciably increasing the strength of spring 21. When the strength of spring 22 is increased the fluid pressure in chamber 26 must of course be decreased in order to preserve the balance with spring 21. In summary therefore, when screw 24 is turned downwardly in sleeve 23 the equilibrium pressure in chamber 6 is reduced, and when screw 24 is turned upwardly in sleeve 23 the equilibrium pressure in chamber 6 is increased.

Valves 30 and 31 function merely as devices for starting and stopping fluid flow through port 7 (not as devices for regulating the pressure in chamber 6). Line 28, 34 may be provided with any number of valves (each operated by a control device responsive to a different condition) to control the starting and stopping of fluid flow through port 7.

Considering the cost of the FIG. 1 mechanism it will be seen that the mechanism housing is formed primarily from the two housing members 2 and 3. With the exception of certain surfaces formed by drilling operations all of the interior and exterior surfaces of members 2 and 3 are visible from points directly above and below said members; i.e. there are no "hidden" recesses when viewing members 2 and 3 in the directions of arrows 45. This surface configuration permits members 2 and 3 to be formed by economical die casting operations. Sand cores are eliminated and the inherent capacity of the die casting process to maintain close tolerances eliminates some of the machining operations which would otherwise be required.

The mechanism illustrated in FIG. 2 is similar in function to that illustrated in FIG. 1, and similar reference numerals are employed wherever applicable.

In the FIG. 2 mechanism fluid is introduced into inlet chamber 5, from where it flows through conduits 10, 11, 12 and 13 into chamber 9. Suitably positioned within chamber 9 is a bracket 50 on which is secured a solenoid coil 51 and core 52. Current for coil 51 is controlled by a room thermostat (not shown). Preferably when the room thermostat is calling for heat coil 51 is energized, and when the room thermostat is satisfied coil 51 is de-energized. Bracket 50 includes an upstanding arm 53 which forms a fulcrum 54 for an armature 55. A tension spring 56 indirectly acts to pull armature 55 away from core 52 when coil 51 is unenergized. Spring 56 is directly connected to an arm 57 which has one end engaged in a recess 58 in armature 55. The other end of arm 57 carries a deformable disc 59 which is adapted to close a port 60 when coil 51 is unenergized. In the illustrated position coil 51 is energized, and armature 55 is in a lowered position such that spring 56 is enabled to keep arm 57 down in its illustrated position. De-energization of coil 51 causes spring 56 to move the right end portion of armature 55 upwardly such that its extreme right end portion 61 pressures against the underside of arm 57 and thereby forces disc 59 to close port 60. When port 60 is closed the pressure in chamber 9 is equalized with that in chamber 5, and port 7 is closed by diaphragm 8.

Port 60 leads to a passage 62, in which is positioned a compression spring 63. Spring 63 releasably holds a conical valve member 64 against a seat member 65. Valve member 64 is operated through the mechanism of a conventional thrust button 66, capillary tubing 67, and thermal bulb 68. Bulb 68 is preferably positioned adjacent the pilot burner of a gas burner (not shown). The operation of mechanism 66, 67, 68 is conventional in that when the pilot burner is on the thermal material in bulb 68 expands to force button 66 downward, and when the pilot burner is extinguished the thermal material in bulb 68 contracts to allow button 66 to move upward. Movement of button 66 is effective to move valve member 64 toward and away from seat member 65. When member 64 is away from member 65 fluid is free to flow through passage 85 and into the pressure regulator mechanism indicated generally by numeral 69.

Mechanism 69 includes two housing members 70 and 71 between which is clamped a diaphragm 72. Compression springs 73 and 74 are positioned on opposite sides of diaphragm 72, and an adjusting screw 75 is threaded through one wall of member 71 into pressure engagement with a spring retainer plate 76. Screw 75 acts to adjust the equilibrium pressure in chamber 6 in the same manner as screw 24. The inlet passage 77 for mechanism 69 leads to a seat member 78 which is provided with a passage 79, divergent in a downstream direction. A ball 80 is positioned in passage 79. A bleed passage 81 leads from the outlet 86 of chamber 82 (to the left of diaphragm 72) to a low pressure area (not shown), and a conduit 83 interconnects outlet chamber 6 with the inlet 87 of chamber 84 (to the right of diaphragm 72).

Operation of the FIG. 2 mechanism is such that when either port 60 or seat 65 is closed (i.e. when the pilot light is off or the thermostat is not calling for heat) the pressure in chamber 9 is equal to that in chamber 5, and port 7 is closed.

When the pilot is on and the thermostat is calling for heat the pressure in chamber 9 is exhausted through the bleed passage formed by port 60 and passages 62, 85, 77, 79, 82 and 81. The rate at which pressure is exhausted from chamber 9 is determined by the size of the opening between ball 80 and passage 79. The size of this opening is in turn determined by the position of diaphragm 72. Thus, if diaphragm 72 is flexed to the right the opening will be relatively large, and if diaphragm 72 is flexed to the left the opening will be relatively small. The position of diaphragm 72 is determined by the pressure in chamber 84. A high pressure in chamber 84 results in a flexing of diaphragm 72 to the left with a consequent raising of the pressure on the upstream side of ball 80. This rise in pressure ultimately raises the pressure in chamber 9 so as to result in at least a partial closing of port 7. Partial closing of port 7 results in a pressure decrease in conduit 83 and chamber 84 so as to produce a relatively constant equilibrium pressure in chamber 6. As previously stated, the value of the equilibrium pressure is determined by the adjusted position of screw 75.

It will be noted that only a small part of the fluid through inlet 5 is directed through mechanism 69. Mechanism 69 can be made as a relatively small device and still exert its "pressure-regulating" action, irrespective of the size of the main valve body. When mechanism 69 is used with larger sized valve bodies this factor becomes quite important from the economic standpoint.

I claim:

1. Fluid regulator mechanism comprising a first housing member forming an inlet chamber, an outlet chamber and a port therebetween; a diaphragm positioned on said housing member and overlying the port; a second housing member overlying said diaphragm to form an enclosed space distinct from the inlet and outlet chambers; first conduit means interconnecting said inlet chamber with said enclosed space but by-passing said outlet chamber; an opening formed in the wall of said second housing member; a solenoid in said enclosed space; arm means adjacent the solenoid and extending into registry with the opening to control fluid flow therethrough under the influence of the solenoid; means forming a cylindrical chamber downstream from the opening; a second port formed in an end wall of the cylindrical chamber; a valve within said cylindrical chamber; thermostatic power means including a plunger projecting through said second port into engagement with the valve to move said valve away from the second port on temperature increase of said power means; a casing member separate from the aforementioned housing members; said casing member including a central wall provided with a port-forming aperture and peripheral flange; coupling means connecting the second and third ports; a second diaphragm secured to the peripheral flange to cooperate with the central wall in forming a bleed chamber; bleed passage means leading from the bleed chamber to an area of low pressure; said bleed passage means having a greater cross-sectional area than the first conduit means; structure within the bleed chamber and carried by the second diaphragm for controlling fluid flow through the third port; a second casing member including a central wall and peripheral flange engaged with the peripheral portion of the second diaphragm to cooperate therewith in forming a pressure regulating chamber; and second conduit means between the aforementioned outlet chamber and pressure regulating chamber; whereby (1) when the pressure in the outlet chamber increases above a predetermined value the second diaphragm restricts flow into the bleed passage so as to increase the pressure within the enclosed space overlying the first diaphragm and (2) when the pressure in the outlet chamber decreases below a predetermined value the fluid in the enclosed space will be at a lower pressure than that in the inlet chamber so as to open the first port.

2. Fluid regulator mechanism comprising a first housing member forming an inlet chamber, an outlet chamber and a port therebetween; a first diaphragm positioned on said housing member and overlying the port; a second housing member overlying said diaphragm to form an enclosed space distinct from the inlet and outlet chambers; a first conduit means interconnecting said inlet chamber with said enclosed space but by-passing said outlet chamber; said second housing member including a web wall and peripheral flange extending away from the diaphragm; an annular shoulder formed between the edge of the peripheral flange and the web wall; a second diaphragm positioned on the annular shoulder and cooperating with the web wall to form a bleed chamber; a cover plate positioned on the edge of the peripheral flange and cooperating with the second diaphragm to form a pressure regulating chamber; bleed passage means leading from said bleed chamber to atmosphere; a second port formed in the web wall; valve structure within the bleed chamber and operated by the second diaphragm for controlling fluid flow through said second port; said bleed passage means having a greater cross-sectional area than said first conduit means; and second conduit means between the outlet chamber and pressure regulating chamber; said regulating chamber being closed except for its connection with the second conduit means.

References Cited in the file of this patent

UNITED STATES PATENTS

| | | |
|---|---|---|
| 1,666,270 | Soderberg | Apr. 17, 1928 |
| 1,813,401 | Helmstaedter | July 7, 1931 |
| 1,851,062 | Protzer | Mar. 29, 1932 |
| 1,987,032 | Spence | Jan. 8, 1935 |
| 2,113,943 | Kimball | Apr. 17, 1938 |
| 2,210,646 | Wheeler | Aug. 6, 1940 |
| 2,265,210 | Waddell | Dec. 9, 1941 |
| 2,312,251 | Johnson | Feb. 23, 1943 |
| 2,327,542 | Matteson | Aug. 24, 1943 |
| 2,743,608 | Hunter | May 1, 1956 |

FOREIGN PATENTS

| | | |
|---|---|---|
| 455,717 | Germany | Feb. 10, 1928 |